T. J. DICKERSON.
Wringer-Rolls.

No. 156,548.      Patented Nov. 3, 1874.

Witnesses
John Becker
Fred. Haymes

T. J. Dickerson
by his Attorneys
Brown & Allen

UNITED STATES PATENT OFFICE.

THEODORE J. DICKERSON, OF AUBURN, NEW YORK.

IMPROVEMENT IN WRINGER-ROLLS.

Specification forming part of Letters Patent No. 156,548, dated November 3, 1874; application filed August 22, 1874.

*To all whom it may concern:*

Be it known that I, THEODORE J. DICKERSON, of Auburn, in the county of Cayuga and State of New York, have invented an Improved Wringer-Roll, of which the following is a specification:

My invention consists in the combination, with a shaft and rubber coating surrounding the same, of a metallic skeleton or frame formed with longitudinal bars and radial projections, around which the rubber is molded to form an elastic roller, and with collars at the ends for attaching said roller thus formed, whereby the rubber is prevented from accidental displacement, but may be removed, when necessary, without injury to the shaft.

Figure 1:
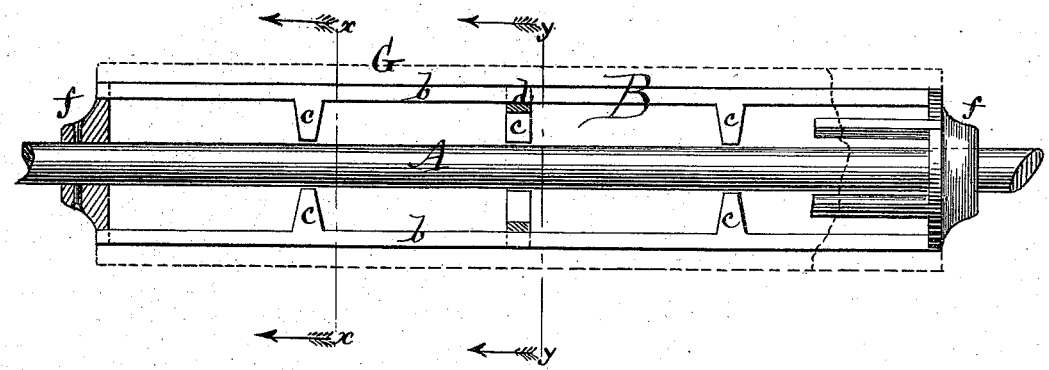
Figure 2:
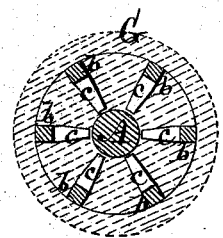
Figure 3:
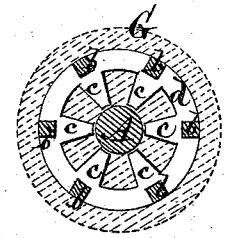

In the accompanying drawing, Figure 1 is a longitudinal section of my improvement. Fig. 2 is a transverse section taken on the line x x of Fig. 1. Fig. 3 is a transverse section taken in the line y y of Fig. 1.

A represents a shaft, such as is used for the rollers of clothes-wringers, and machines of similar construction. B is a metallic skeleton frame, consisting of longitudinal bars b, from which short bars c project radially toward the center to within a short distance of the shaft A. About midway of the length of the frame is a ring, d, which supports and braces the bars b at that point, and which may have the short radial bars c formed with it. At each end of the frame the bars b terminate in a collar, f, through which, and a shaft, A, are passed pins or screws, by which means the frame is securely held in place on the shaft, and prevented from accidental displacement, although it may be removed, when necessary, by withdrawing the pins or screws. The rubber coating G is molded around the frame B, as shown in dotted lines, and this may be done either before or after the frame is put in place on the shaft. When it is done before placing the frame on the shaft, a rod, corresponding in size with the shaft, is passed through the frame in order to preserve the proper longitudinal opening in the mold. The rubber G passes around the bars b and c and ring d, which are thus embedded in said rubber, as shown, so as to prevent its displacement in any direction. The roller thus formed is secured to the shaft by pins or screws through the collar, as before described.

I am aware that the roller-shaft of a wringer has been formed with radial arms or ribs, and with longitudinal bars formed on said shaft; but such is not my invention, the important feature of which consists in making the skeleton frame entirely independent of the shaft, by which means it may be taken apart, for removing the rubber, without injury to the shaft.

What I claim as new, and desire to secure by Letters Patent, is—

In combination with the shaft A, the longitudinal bars b, having the radial bars or arms c, projecting inwardly to within a short distance of the shaft A, and the collars f f, the whole being capable of detachment for removing the rubber, substantially as herein shown and described.

THEODORE J. DICKERSON.

Witnesses:
 HORACE T. COOK,
 MELVIN H. STEARNS.